(12) United States Patent
Feng et al.

(10) Patent No.: US 11,955,861 B2
(45) Date of Patent: Apr. 9, 2024

(54) BRUSHLESS MOTOR, STATOR AND METHOD OF MANUFACTURING THE SAME

(71) Applicant: Johnson Electric International AG, Murten (CH)

(72) Inventors: Ying Feng, Shenzhen (CN); Yick Kun Kenny Tsui, Hong Kong (CN); Ping Wo Poon, Hong Kong (CN); Kam Ting Ko, Hong Kong (CN); Siu Kin Tam, Hong Kong (CN); Da Wei Zhou, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 227 days.

(21) Appl. No.: 16/947,278

(22) Filed: Jul. 27, 2020

(65) Prior Publication Data

US 2021/0028666 A1 Jan. 28, 2021

(30) Foreign Application Priority Data

Jul. 26, 2019 (CN) .......................... 201910684966.4

(51) Int. Cl.
*H02K 3/52* (2006.01)
*H02K 1/14* (2006.01)
(Continued)

(52) U.S. Cl.
CPC ............. *H02K 3/522* (2013.01); *H02K 1/146* (2013.01); *H02K 11/40* (2016.01); *H02K 15/0062* (2013.01); *H02K 15/022* (2013.01)

(58) Field of Classification Search
CPC .......... H02K 3/522; H02K 11/33; H02K 5/02; H02K 3/345; H02K 11/40; H02K 1/146;
(Continued)

(56) References Cited

U.S. PATENT DOCUMENTS

| 6,429,568 | B1 * | 8/2002 | Shen ....................... H02K 15/02 |
| | | | 310/254.1 |
| 10,253,736 | B2 * | 4/2019 | Honda ................... H02K 11/40 |

(Continued)

FOREIGN PATENT DOCUMENTS

EP 3471243 A1 4/2019

OTHER PUBLICATIONS

EP Communication from the Examining Division for EP 20187831.1, dated Dec. 3, 2020.

*Primary Examiner* — Leda T Pham
(74) *Attorney, Agent, or Firm* — Aird & McBurney LP

(57) ABSTRACT

A stator of a brushless motor is disclosed which includes a stator core, an insulating frame arranged on the stator core, and a plurality of windings wound around the insulating frame. The stator core includes a ring-shaped yoke part and a pole part mounted to the radial inner side of the yoke part. The pole part includes a plurality of teeth spaced-apart from each other along the circumferential direction, and a ring-shaped portion arranged at and connected to the radial inner side of the teeth. The radial outer sides of the teeth abut against the radial inner side of the yoke part. The insulating frame is arranged on the pole part. A plurality of power terminals are fixed to one axial end of the insulating frame and respectively electrically connected to the windings.

14 Claims, 7 Drawing Sheets

(51) Int. Cl.
*H02K 11/40* (2016.01)
*H02K 15/00* (2006.01)
*H02K 15/02* (2006.01)

(58) Field of Classification Search
CPC ... H02K 1/148; H02K 15/0062; H02K 15/022
See application file for complete search history.

(56) References Cited

U.S. PATENT DOCUMENTS

| | | | |
|---|---|---|---|
| 10,734,850 B2* | 8/2020 | Li | H02K 21/16 |
| 2004/0189136 A1* | 9/2004 | Kolomeitsev | H02K 3/345 |
| | | | 310/216.082 |
| 2011/0020154 A1* | 1/2011 | Matsuda | H02K 3/325 |
| | | | 310/43 |
| 2017/0054352 A1 | 2/2017 | Li | |
| 2017/0256995 A1* | 9/2017 | Lam | H02K 5/225 |

* cited by examiner

BRUSHLESS MOTOR, STATOR AND METHOD OF MANUFACTURING THE SAME

CROSS REFERENCE TO RELATED APPLICATIONS

This non-provisional patent application claims priority under 35 U.S.C. § 119(a) from Patent Application No. 201910684966.4 filed in The People's Republic of China on Jul. 26, 2019.

FIELD OF THE DISCLOSURE

The disclosure relates to the field of motors, in particular, to a stator of a brushless motor, a brushless motor, and a method for manufacturing the brushless motor stator.

BACKGROUND OF THE DISCLOSURE

The stator of the brushless motor includes a stator core, an insulating frame covering the surface of the stator core, and stator windings wound on the insulating frame. The stator core includes a ring-shaped yoke and a plurality of teeth protruding inward from the yoke.

In traditional, there are two types of stator cores, i.e., a stator core formed in one piece and a segmented stator core. The stator core formed in one piece is formed by stacking a plurality of laminations in the axial direction, wherein each of the laminations includes a plurality of teeth and a yoke which are connected in one piece. The segmented stator core is formed by assembling several sections in the circumferential direction, wherein each of the sections is formed by stacking a plurality of laminations in the axial direction, and each lamination includes a tooth and its corresponding portion of the yoke.

During the process of winding the windings on the stator core formed in one piece, since the opening formed between the adjacent teeth of the stator core faces radially and inwardly and the spacing between the adjacent teeth is small, it is required for a needle winding machine to winding the windings around the corresponding teeth one after the other, which results in a low winding efficiency.

The several sections arranged in the circumferential direction of the segmented stator core are independent of each other and thus can be wound simultaneously at the same time, thereby improving the winding efficiency. However, it is required to assemble the several sections together after winding, which results in a complicated assembly process. Furthermore, the stator including a segmented stator core is generally large in size. In particular, the segmented stator core is unsuitable for manufacturing a stator with an outer diameter of less than 50 mm. In addition, after assembling the sections of the segmented stator core together, it is necessary to assemble a support frame for mounting terminals connecting to the windings and a controller, to the insulating frame, making the assembly process of the stator more complicated with increased manufacturing cost.

SUMMARY

In view of this, the present disclosure aims to provide a brushless motor, a stator, and a manufacturing method of the stator that can solve the above problems, or at least to some extent.

To this end, in one aspect of the present disclosure, it may provide a brushless motor stator including a stator core, an insulation frame arranged on the stator core, and a plurality of windings wound around the insulating frame. The stator core comprises a ring-shaped yoke part, and a pole part mounted to a radial inner side of the yoke part; the pole part comprises a plurality of teeth spaced-apart from each other along a circumferential direction, and a ring-shaped portion connected to radial inner sides of the teeth; radial outer sides of the teeth abut against the radial inner side of the yoke part; the insulating frame is arranged on the pole part; and a plurality of power terminals are fixed to one axial end of the insulating frame and respectively electrically connected to the windings.

In some embodiments, the stator further comprises at least one compensation ring arranged at an axial end surface of the yoke part.

In some embodiments, wherein the insulating frame comprises an inner ring corresponding to the ring-shaped portion and a plurality of branches respectively corresponding to the teeth, wherein the windings are wound around surfaces of the branches.

In some embodiments, the ring-shaped portion comprises a plurality of pole shoes respectively corresponding to the teeth, and two adjacent pole shoes are connected by a bridge.

In some embodiments, the radial outer sides of the teeth protrude beyond radial outer ends of the branches.

In some embodiments, the insulating frame further comprises a connecting frame formed at an axial end of the inner ring, and the connecting frame is formed with a bearing seat at the center thereof.

In some embodiments, the insulating frame further comprises at least two protrusions formed at a radial inner side of the inner ring, the at least two protrusions protrude radially and inwardly from the radial inner side of the inner ring.

In some embodiments, the axial end of the insulating frame is further fixed with a ground terminal comprising a first end extending in an axial direction and a second end extending radially and outwardly from the first end.

In the other aspect, the present disclosure may also provide a brushless motor including the aforementioned stator, and a rotatable rotor provided in the brushless motor stator.

In some embodiments, the motor further comprises a metal housing and a controller, and the stator further comprises a ground terminal, wherein one end of the ground terminal is connected to the controller, and the other end of the ground terminal is connected to the metal housing so that the controller is grounded through the ground terminal.

In yet another aspect, the present disclosure may also provide a method for manufacturing the stator including the following steps:

1) providing a pole part, which comprises a plurality of teeth spaced-apart from each other along a circumferential direction, and a ring-shaped portion connected to radial inner sides of the teeth;

2) arranging an insulating frame to the pole part, the insulating frame comprising an inner ring corresponding to the ring-shaped portion, and a plurality of branches respectively corresponding to the teeth, an axial end of the inner ring being fixed with a plurality of power terminals;

3) winding the windings on the branches of the insulating frame, and connecting the windings to the corresponding power terminals;

4) providing a yoke part and pressing the pole part into the yoke part, with radial outer sides of the teeth abutting against a radial inner side of the yoke part.

In some embodiments, an axial end of the inner ring is formed with a connecting frame, and the connecting frame is injection molded to the power terminals, or the power terminals are mounted to the connecting frame.

In some embodiments, the insulating frame comprises at least two protrusions formed at a radial inner side of the inner ring and configured to abut against a radial outer wall of a rotor.

In some embodiments, at least one compensation ring is arranged at an axial end surface of the yoke part.

In some embodiments, in step 2), the axial end of the inner ring is further fixed with a ground terminal.

The present disclosure provides a stator core including a ring-shaped yoke part and a pole part mounted on the radially inner side of the yoke part, so that when winding the windings, the windings can be wound first on the insulating frame corresponding to the pole part, and then the pole part with the insulating frame and the windings can be assembled into the yoke part. In addition, the yoke part and the pole part of the present disclosure can be stamped at the same time. Therefore, the assembly process is simplified and the winding efficiency is improved.

DETAILED DESCRIPTION OF THE PREFERRED EMBODIMENTS

Figure 1:
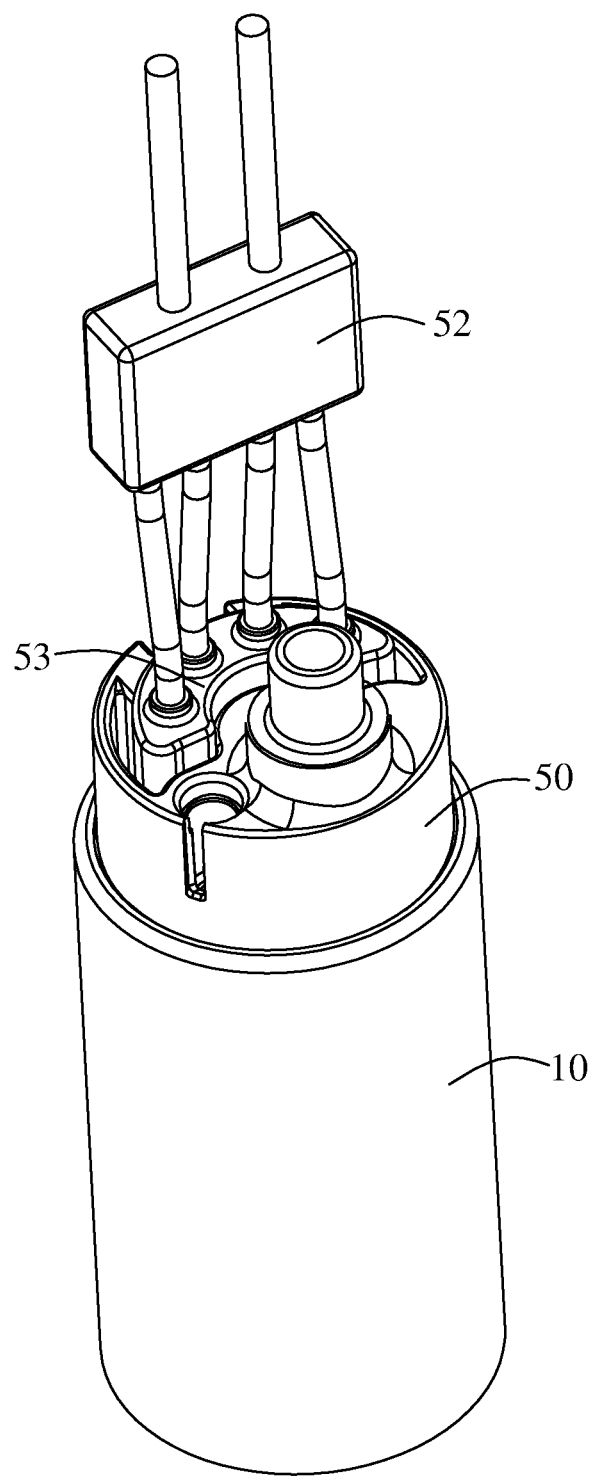
FIG. 1 is a perspective view of a brushless motor according to one embodiment of the present disclosure.
Figure 2:
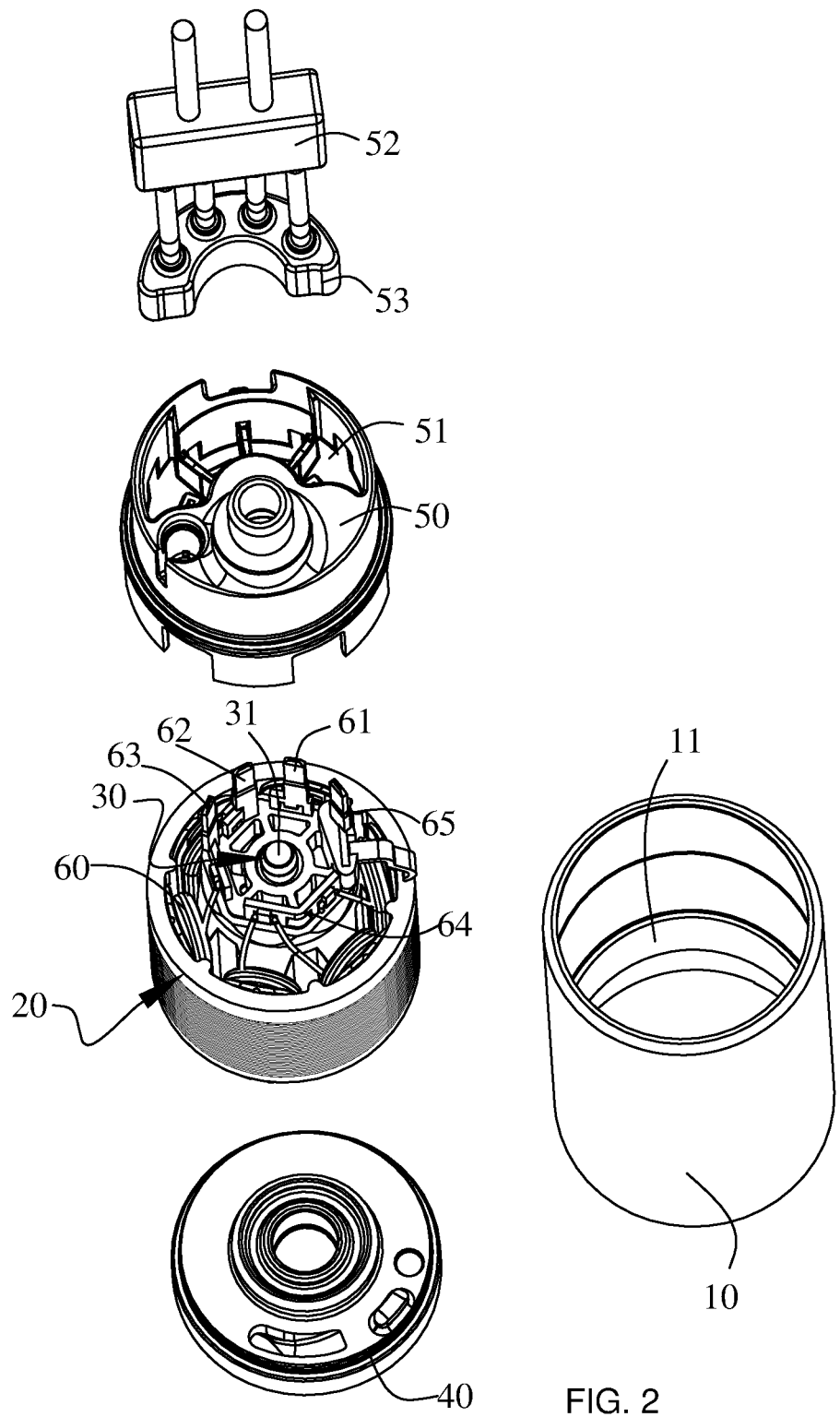
FIG. 2 is an exploded view of the brushless motor shown in FIG. 1.
Figure 3:
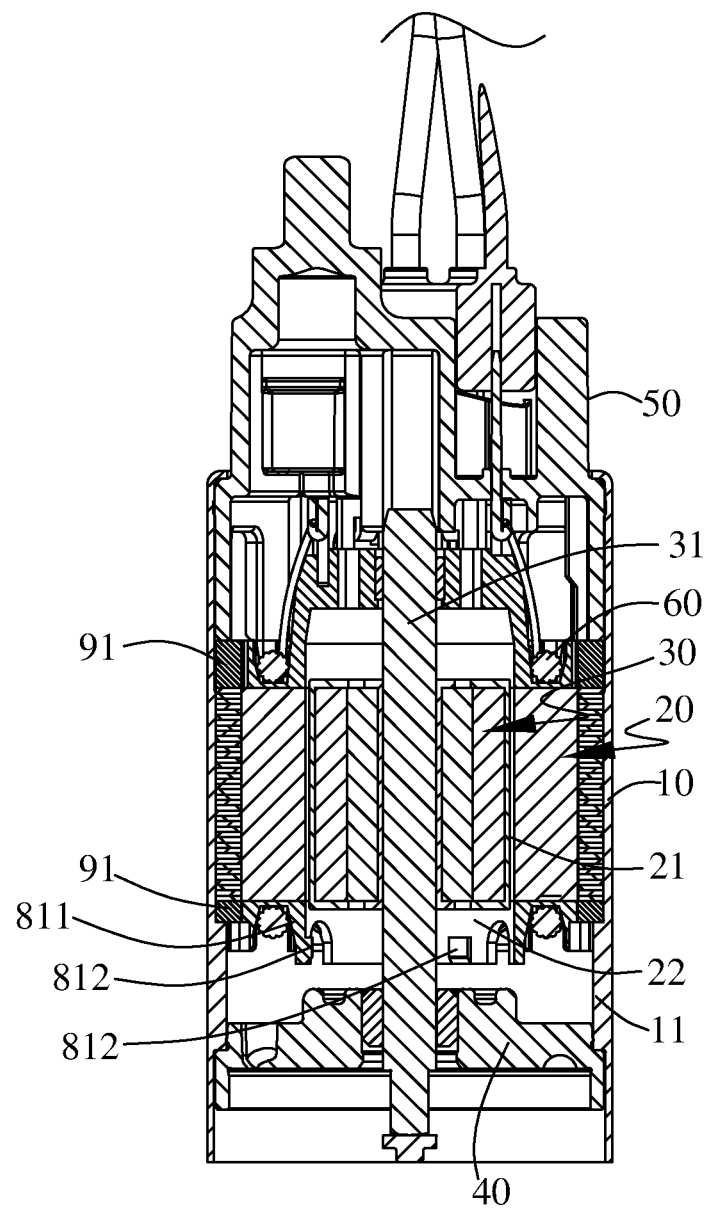
FIG. 3 is a longitudinal cross-sectional view of the brushless motor shown in FIG. 1.
Figure 4:
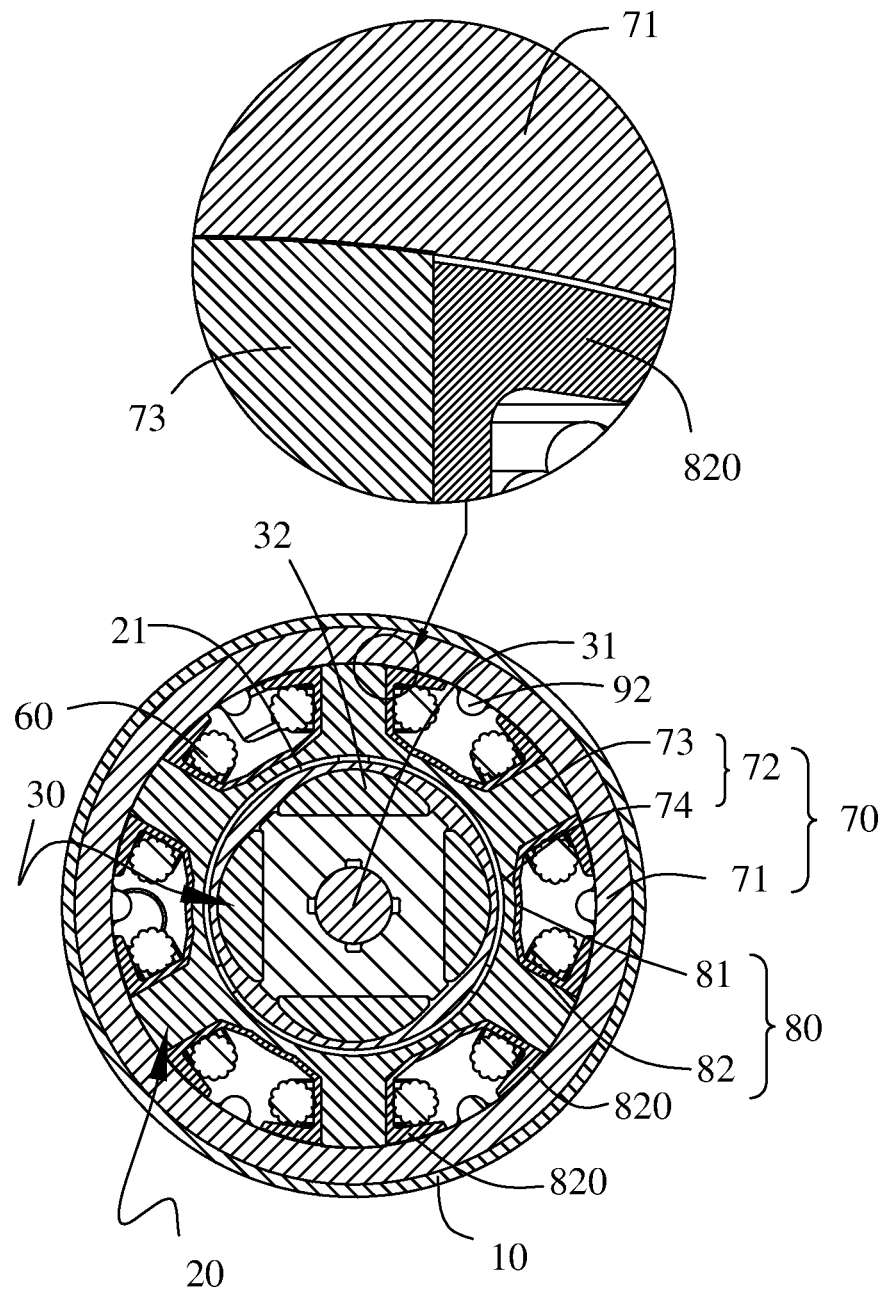
FIG. 4 is a transverse cross-sectional view of the brushless motor shown in FIG. 1.

The present disclosure will be described in detail below in conjunction with the accompanying drawings and specific embodiments, so that the technical solutions and beneficial effects of the present disclosure are more clear. It can be understood that the drawings are provided for reference and explanation only, and are not intended to limit the present disclosure. The dimensions shown in the drawings are only for clear description and do not limit the proportional relationship.

Referring to FIGS. 1 to 4, a brushless motor according to one embodiment of the present disclosure includes a metal housing 10, a stator 20 received in the metal housing 10, and a rotatable rotor 30 received in the stator 20. The stator 20 has a receiving cavity 21 at the center thereof and an opening side 22 at one axial end thereof. The rotor 30 may be adapted to be assembled into the receiving cavity 21 through the opening side 22.

In this embodiment, the metal housing 10 may be in the shape of a hollow cylinder with both axial ends opened, and its partial inner wall may extend radially and inwardly to form an annular flange 11. The lower end surface of the stator 20 may be supported by the upper end surface of the annular flange 11. The brushless motor may further include an end cover 40 abutting on the lower end surface of the annular flange 11, and a mounting seat 50 supported by the upper end surface of the stator 20. One end of the rotating shaft 31 of the rotor 30 may protrude from the lower end surface of the stator 20 and may be rotatably connected with the end cover 40, and the other end of the rotating shaft 31 may protrude from the upper end surface of the stator 20 and may be rotatably connected to the mounting seat 50. The mounting seat 50 may be provided with an accommodating groove 51 for mounting a connecting element 53 electrically connected to a controller 52.

Preferably, the outer diameter of the brushless motor is less than or equal to 50 mm. In this embodiment, the brushless motor has six slots and four poles. Specifically, the stator 20 includes six teeth which are spaced-apart from each other, and six slots each of which is formed between two adjacent teeth. The rotor 30 includes four pieces of magnetic steel 32. In other embodiments, the brushless motor may include other numbers of tooth slots and magnetic poles. For example, a brushless motor may have six slots and two poles. In this embodiment, the stator windings 60 are connected in a Y shape. The stator 20 includes a plurality of power terminals. The power terminals include a first, a second, and a third terminals 61, 62, 63, which are respectively electrically connected to the corresponding ends of three sets of the windings 60, and a common terminal 64, which is electrically connected to the other ends of the three sets of the windings 60. In other embodiments, the stator winding 60 may be connected in a $\Delta$ shape, so that the above-mentioned common terminal 64 is omitted. Preferably, the stator 20 may further include a ground terminal 65 in contact with the radial inner wall of the metal housing 10, so as to achieve the purpose of grounding. One ends of the first, the second, the third, the fourth terminals 61, 62, 63, 64, and the ground terminal 65 may pass through the mounting seat 50 and may be electrically connected to the connecting element 53 installed in the mounting seat 50.

Referring to FIGS. 4 to 7, in this embodiment, the stator 20 may include a stator core 70, an insulating frame 80 arranged on the stator core 70, and the windings 60 wound on the insulating frame 80. The stator core 70 includes a ring-shaped yoke part 71, and a pole part 72 mounted at the radial inner wall of the yoke part 71. Both the yoke part 71 and the pole part 72 may be formed by stacking a plurality of stamped laminations. The pole part 72 may include a plurality of teeth 73 distributed at intervals in the circumferential direction, and a ring-shaped portion 74 provided at the radial inner side of the plurality of teeth 73 and connected to the plurality of teeth 73. The radial outer sides of the teeth 73 abut against the radial inner wall of the yoke part 71. The ring-shaped portion 74 includes a plurality of pole shoes 740 corresponding to the teeth 73 one-by-one, respectively, and a plurality of bridges 741 which function to connect two adjacent pole shoes 740. In this way, the plurality of the teeth 73 is formed in one piece, which facilitates the assembly of the stator 20. In this embodiment, there are three bridges 741 distributed in the axial direction between two adjacent pole shoes 740, with a hole 742 formed between two adjacent bridges 741. The insulating frame 80 is arranged on the surface of the pole part 72 and surrounds each of the teeth 73. The windings 60 can be firstly wound on the insulating frame 80 corresponding to the teeth 73 of the pole part 72, and then the pole part 72 with windings can be assembled into the yoke part 71. In addition, the yoke part 71 and the pole part 72 in this embodiment can be stamped at the same time. Therefore, the assembly process can be simplified and the winding efficiency can be improved.

Preferably, the stator 20 further includes a compensation ring 91 arranged on an axial end surface of the yoke part 71 by means of injection molding or mounting, which functions to compensate the axial installation tolerance between the yoke part 71 and the metal housing 10 so as to keep the yoke part 71 in the correct installation position. In this embodiment, the stator 20 includes two compensation rings 91 respectively provided on the two axial end surfaces of the yoke part 71 by means of injection molding, and a plurality of spokes 92 connecting the two compensation rings 91 at the radial inner sides of the two compensation rings 91. The plurality of connecting spokes 92 are spaced-apart from each other along the circumferential direction with equal intervals therebetween. The yoke part 71 is arranged between the two compensation rings 91. One of the compensation rings 91 is configured to be supported by the annular flange 11 of the metal housing 10, and the other of the compensation rings 91 is configured to support the mounting seat 50 (see in FIG. 3). In order to improve the connection strength between the yoke part 71 and the compensation rings 91, the end surfaces of the two compensation rings 91 facing the yoke part 71 may be provided with projections 910, respectively. Accordingly, the end surfaces of the yoke part 71 facing the compensation rings 91 may be provided with grooves 710. The engagement between the projections 910 and the grooves 710 can make the yoke part 71 and the compensation rings 91 more firmly connected.

The insulating frame 80 may be arranged to the surface of the pole part 72 by means of over-molding or mounting. In this embodiment, the insulating frame 80 includes an inner ring 81 corresponding to the ring-shaped portion 74, and a plurality of branches 82 respectively corresponding to the teeth 73. The windings 60 are wound around the surfaces of the branches 82. In this embodiment, protrusions 810 are formed on the radial inner wall of the inner ring 81 corresponding to the holes 742, and the protrusions 810 may be received in the corresponding holes 742. Preferably, the inner ring 81 covers the radial outer wall of the ring-shaped portion 74 and both end surfaces of the ring-shaped portion 74 in the axial direction. The branches 82 may cover both side walls of the teeth 73 in the circumferential direction and both end surfaces of the teeth 73 in the axial direction. More preferably, the branches 82 may be respectively provided with stoppers 820 on the radial outer sides of the two side walls in the circumferential direction, so as to limit the windings 60 on the branches 82. The stopper 820 may extend from the side wall in a direction away from the corresponding tooth 73 in the circumferential direction. In this embodiment, all the stoppers 820 of the insulating frame 80 may be located on the same circumferential surface. Preferably, the radial outer side of the teeth 73 protrudes beyond the radial outer side of the branch 82, that is, the outer diameter of the teeth 73 is larger than the outer diameter of the stoppers 820, as shown in the partial view of FIG. 4. In this way, when the pole part 72 is pressed into the yoke part 71 with the teeth 73 in contact with the inner wall of the yoke part 71, a certain gap is formed between the insulating frame 80 and the yoke part 71 without interfering the assembly of the pole part 72, and the insulating frame 80 would not be deformed during the pressing process.

Figure 5:
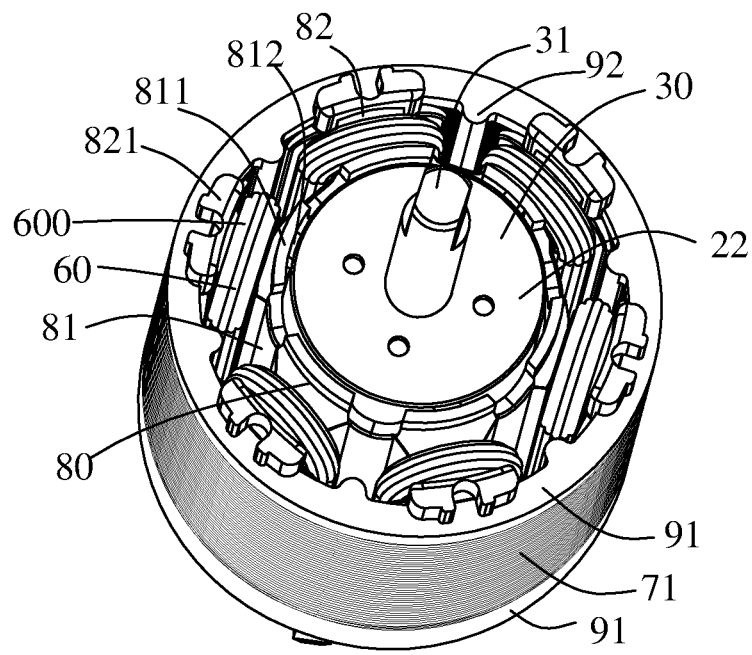
FIG. 5 is a perspective view of a stator and a rotor of the brushless motor shown in FIG. 1, with the stator and the rotor assembled together.
Figure 6:
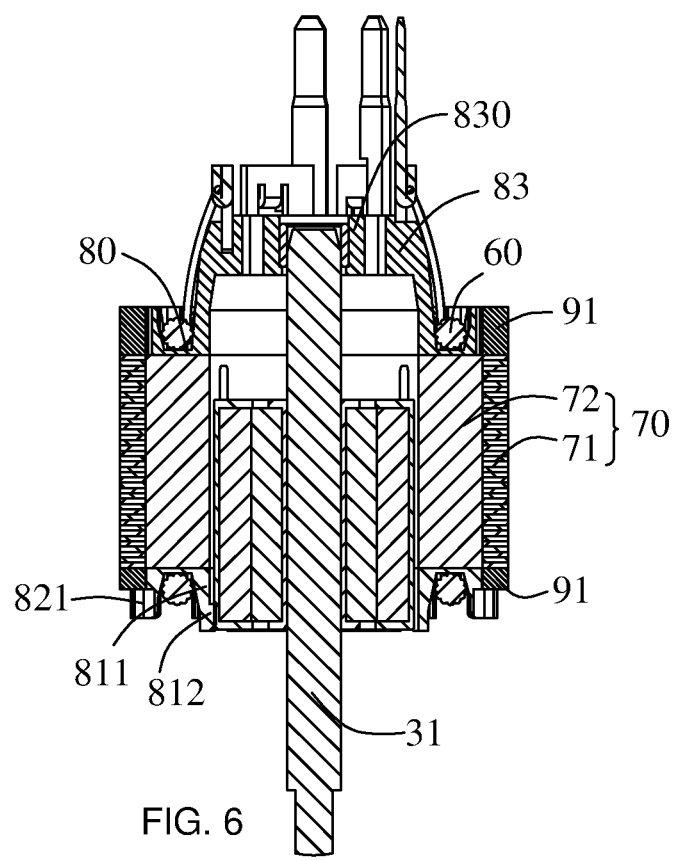
FIG. 6 is a longitudinal cross-sectional view of the stator and the rotor shown in FIG. 5.
Figure 7:
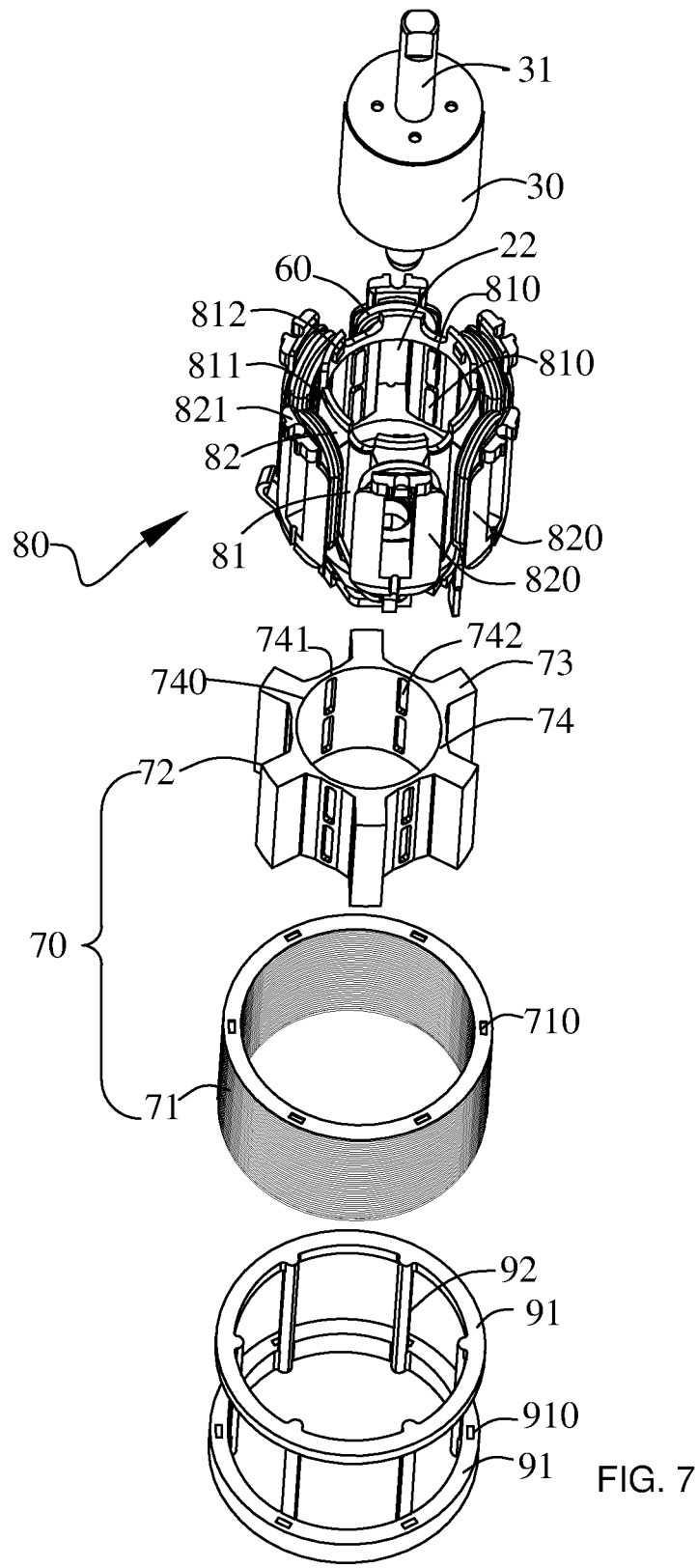
FIG. 7 is an exploded view of the stator and the rotor shown in FIG. 5.

More preferably, an end surface of each branch 82 in the axial direction further extends radially and outwardly to form a first limiting portion 821 for abutting the end surface of the yoke part 71 or the end surface of the compensation ring 91. Preferably, the first limiting portions 821 are arranged at the opening side 22 of the stator 20. Based on the first limiting portions 821, when the pole part 72 with the insulating frame 80 and the windings 60 is assembled into the yoke part 71, the first limiting portions 821 on the insulating frame 80 abut against the end surface of the yoke part 71 or the end surface of the compensation ring 91, as shown in FIG. 5, then the pole part 72 can be axially positioned and installed to the correct position. Preferably, the first limiting portions 821 protrudes axially beyond the ends 600 of the windings 60 so as to further limit the radial outer sides of the ends 600 of the windings 60 at the same time. The inner ring 81 of the insulating frame 80 may also extend in the axial direction at the opening side 22 to form a plurality of second limiting portions 811, to further limit the radial inner sides of the ends 600 of the windings 60. In this embodiment, the second limiting portions 811 may be evenly spaced along the circumferential direction, and each branch 82 may correspond to a second limiting portion 811. More preferably, at least two protrusions 812 are formed on the radial inner side of the inner ring 81 and evenly disposed in the circumferential direction. Before assembling the metal housing 10, the rotor 30 can be assembled into the receiving cavity 21 of the stator 20 via the opening side 22, and the radial outer wall of the rotor 30 abuts against the protrusions 812, as shown in FIGS. 5 and 6, to overcome the magnetic force applied to the rotor 30, so as to maintain the rotor 30 in the correct position, which facilitates the installation of the rotor 30. In this embodiment, the inner ring 81 includes three protrusions 812 which are spaced-apart from each other in the circumferential direction with equal intervals. Each protrusion 812 may be formed on the radial inner wall of the second limiting portion 811.

Figure 8:
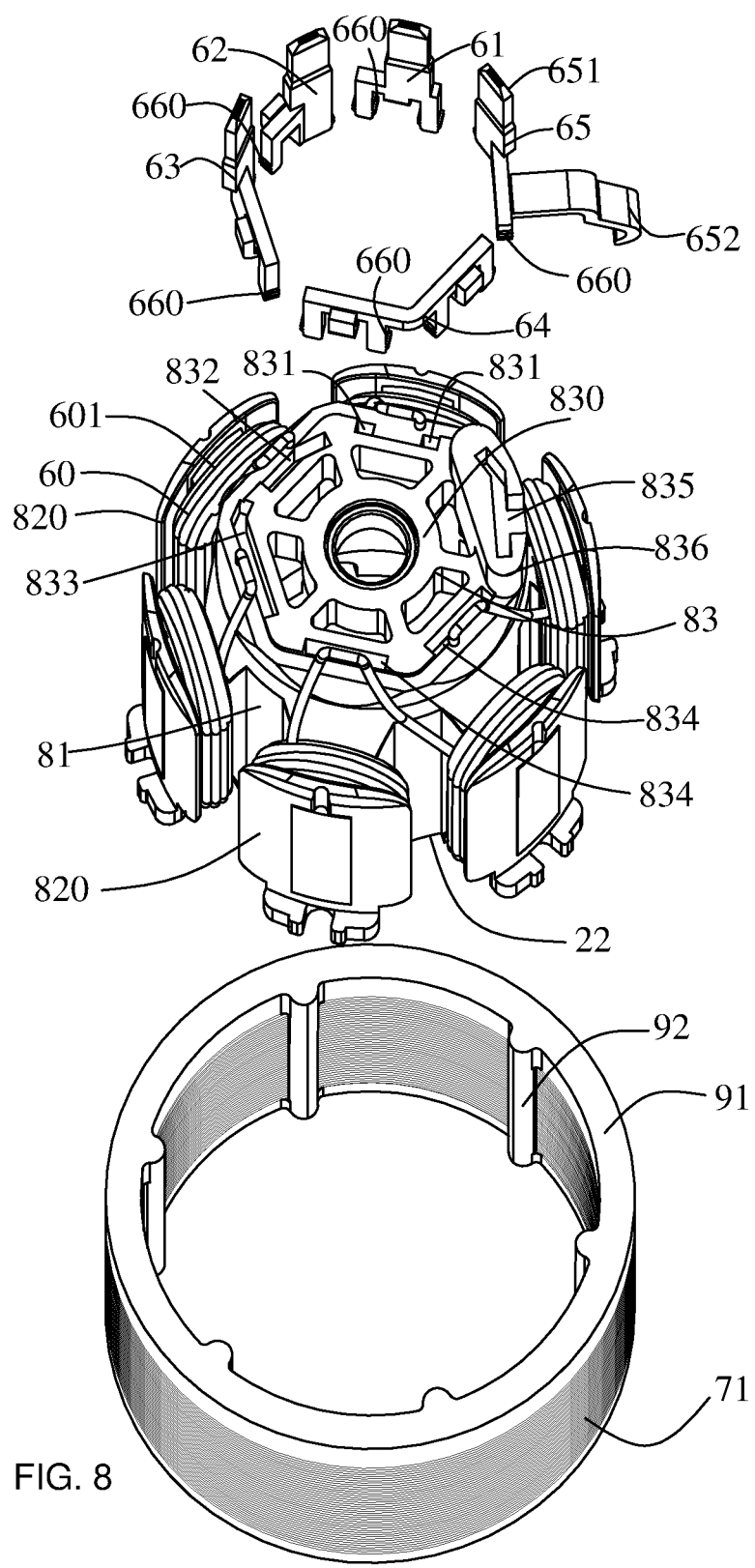
FIG. 8 is an exploded view of the stator shown in FIG. 5.

Referring to FIG. 8, preferably, the end of the inner ring 81 away from the opening side 22 protrudes beyond the other ends 601 of the windings 60 in the axial direction, to further limit the windings 60. Preferably, the end of the inner ring 81 has a regular polygon shape, and in this embodiment, it has a regular hexagon shape. In this embodiment, a connecting frame 83 is further formed at the end of the inner ring 81. The connecting frame 83 may be injection molded to the terminals 61-65, or the terminals 61-65 may be installed to the connecting frame 83. The periphery of the connecting frame 83 may be connected to the end of the inner ring 81, so the connecting frame 83 in this embodiment also has a regular hexagonal shape. The connecting frame 83 and the insulating frame 80 may be integrated, so that there is no need to additionally assemble it to the insulating frame 80, which not only simplifies the assembly process of the stator 20, but also saves manufacturing cost. A bearing seat 830 may be formed at the center of the connecting frame 83, and a bearing may be installed to the bearing seat 830 or integrated with the bearing seat 830 for supporting the rotating shaft 31 of the rotor 30.

In this embodiment, the first, the second, the third terminals 61-63 and the ground terminal 65 are arranged to be respectively corresponding to four sides of the regular hexagon shape, and the common terminal 64 is arranged to be corresponding to the remaining two adjacent sides of the regular hexagon shape. Specifically, the end surface of the connecting frame 83 may be recessed in the axial direction to form sockets 831, 832, 833 corresponding to the first, the second, and the third terminals 61-63, respectively, and two adjacent sockets 834 corresponding to the common terminal 64. The terminals 61-64 are inserted into corresponding sockets, respectively. Different from the first, the second, the third, and the common terminals 61, 62, 63, 64, in this embodiment, the ground terminal 65 is used to ground the controller 52, and includes a first end 651 extending in the axial direction and connected to the controller 52 and a second end 652 extending radially and outwardly from the first end 651 for abutting the radial inner wall of the metal housing 10. Due to the force between the second end 652 of the ground terminal 65 and the radial inner wall of the metal housing 10, the connecting frame 83 may further include a supporting protrusion 836 for supporting the ground terminal 65 to strengthen the mechanical strength of the connecting frame 83 here. A socket 835 may be formed in the supporting protrusion 836 for receiving the ground terminal 65. In order to improve the connection stability between each terminal and its corresponding socket, at least one barb 660 may be formed on the terminal, and the tip of the barb 660 may be directed toward the direction of moving the terminal out of the socket, so as to effectively prevent the terminal from falling out of the socket.

The manufacturing method of the brushless motor in the embodiment of the present disclosure will be further described below.

Step 1: Providing and assembling the stator 20;

A. Providing a pole part 72, which includes a plurality of teeth 73 spaced-apart from each other along the circumferential direction, and a ring-shaped portion 74 arranged at the radial inner side of the plurality of teeth 73 and connected to the radial inner side of the plurality of teeth 73;

B. Arranging an insulating frame 80 on the pole part 72, wherein the insulating frame 80 includes an inner ring 81 corresponding to the ring-shaped portion 74, and a plurality of branches 82 corresponding to the teeth 73, respectively. An axial end of the inner ring 81 of the insulating frame 80 may be fixed with a first, a second, a third terminals and a common terminal 61, 62, 63, 64;

The insulating frame 80 may be arranged at the pole part 72 by means of over-molding or installation. The insulating frame 80 may be injection molded to the plurality of terminals 61-64. Alternatively, the insulating frame 80 may be provided with a plurality of sockets for mounting the plurality of terminals 61-64. Preferably, at least two protrusions 812 are formed on the radial inner side of the inner ring 81. The protrusions 812 function to abut against the radial outer wall of the rotor 30 to overcome the magnetic force applied to the rotor 30, so as to pre-positioning the rotor 30.

C. Winding one winding 60 around each branch 82 of the insulating frame 80, and the winding 60 is connected to the corresponding terminal;

D. Providing a yoke part 71;

Preferably, at least one compensation ring 91 is formed on the end surface of the yoke part 71 by injection molding.

E. Pressing the pole part 72 with the insulating frame 80 and the terminals into the yoke part 71, with the radial outer sides of the plurality of teeth 73 abutting against the radial inner wall of the yoke part 71.

Preferably, moving the pole part 72 until the first limiting portions 821 abut against the compensation ring 91. Then the ground terminal 65 can be inserted into the insulating frame 80 to finalize the assembly of the stator 20. It should be understood that the insulating frame 80 may alternatively be connected with the ground terminal 65 by means of injection molding so as to simplify the assembly process.

Step 2: Assembling a rotor 30 into the stator 20;

Providing a rotor 30 and assembling the rotor 30 into the receiving cavity 21 of the stator 20 via the opening side 22 of the stator 20. Preferably, when assembling the rotor 30 into the stator 20, the protrusion 812 of the insulating frame 80 of the stator 20 abuts against the radial outer wall of the rotor 30.

Step 3: Assembling the stator 20 and the rotor 30 to a metal housing 10.

The stator 20 and the rotor 30 are disposed inside the metal housing 10. The second end 652 of the ground terminal 65 abuts against an inner wall of the metal housing 10 so as to achieve the purpose of grounding.

The above descriptions are only the preferred specific embodiments of the present disclosure, and the protection scope of the present disclosure is not limited to the above-mentioned embodiments. Those skilled in the art can make simple changes or obtain equivalent alternatives of the solutions, which will also fall within the protection scope of the present disclosure.

The invention claimed is:

1. A stator of a brushless motor, comprising a stator core, an insulation frame arranged on the stator core, and a plurality of windings wound around the insulating frame,
   wherein, the stator core comprises a ring-shaped yoke part, and a pole part mounted to a radial inner side of the yoke part;
   the pole part comprises a plurality of teeth spaced-apart from each other along a circumferential direction, and a ring-shaped portion connected to radial inner sides of the teeth;
   radial outer sides of the teeth abut against the radial inner side of the yoke part;
   the insulating frame is arranged on the pole part;
   a plurality of power terminals are fixed to one axial end of the insulating frame and respectively electrically connected to the windings,
   the ring-shaped portion comprises a plurality of pole shoes respectively corresponding to the teeth, and a plurality of bridges configured to connect adjacent pole shoes;
   the ring-shaped portion further comprises a plurality of holes, each of which is formed between two axially adjacent bridges, and
   the insulating frame comprises an inner ring corresponding to the ring-shaped portion and a plurality of branches respectively corresponding to the teeth, the windings are wound on the branches, the insulating frame further comprises a plurality of protrusions formed at a radial inner side of the inner ring corresponding to the holes, and the protrusions are received in the corresponding holes.

2. The stator of a brushless motor according to claim 1, wherein the stator further comprises at least one compensation ring arranged at an axial end surface of the yoke part.

3. The stator of a brushless motor according to claim 1, wherein the radial outer sides of the teeth protrude beyond radial outer ends of the branches.

4. The stator of a brushless motor according to claim 1, wherein the insulating frame further comprises a connecting frame formed at an axial end of the inner ring, and the connecting frame is formed with a bearing seat at the center thereof.

5. The stator of a brushless motor according to claim 1, wherein the insulating frame further comprises at least two protrusions formed at a radial inner side of the inner ring, the at least two protrusions protrude radially and inwardly from the radial inner side of the inner ring.

6. The stator of a brushless motor according to claim 1, wherein the axial end of the insulating frame is further fixed with a ground terminal comprising a first end extending in an axial direction and a second end extending radially and outwardly from the first end.

7. A brushless motor, comprising the stator according to claim 1, and a rotatable rotor provided in the stator.

8. The brushless motor according to claim 7, wherein the motor further comprises a metal housing and a controller, and the stator further comprises a ground terminal, wherein one end of the ground terminal is connected to the controller, and the other end of the ground terminal is connected to the metal housing so that the controller is grounded through the ground terminal.

9. A method for manufacturing a stator of a brushless motor, comprising the following steps:
1) providing a pole part, which comprises a plurality of teeth spaced-apart from each other along a circumferential direction, and a ring-shaped portion connected to radial inner sides of the teeth;
2) arranging an insulating frame to the pole part, the insulating frame comprising an inner ring corresponding to the ring-shaped portion, and a plurality of branches respectively corresponding to the teeth, an axial end of the inner ring being fixed with a plurality of power terminals;
3) winding the windings on the branches of the insulating frame, and connecting the windings to the corresponding power terminals;
4) providing a yoke part and pressing the pole part into the yoke part, with radial outer sides of the teeth abutting against a radial inner side of the yoke part;
wherein, the ring-shaped portion comprises a plurality of pole shoes respectively corresponding to the teeth, and a plurality of bridges configured to connect adjacent pole shoes;
the ring-shaped portion further comprises a plurality of holes, each of which is formed between two axially adjacent bridges, and
the insulating frame further comprises a plurality of protrusions formed at a radial inner side of the inner ring corresponding to the holes, and the protrusions are received in the corresponding holes.

10. The method for manufacturing a stator of a brushless motor according to claim 9, wherein an axial end of the inner ring is formed with a connecting frame, and the connecting frame is injection molded to the power terminals, or the power terminals are mounted to the connecting frame.

11. The method for manufacturing a stator of a brushless motor according to claim 9, wherein the insulating frame comprises at least two protrusions formed at a radial inner side of the inner ring and configured to abut against a radial outer wall of a rotor.

12. The method for manufacturing a stator of a brushless motor according to claim 9, wherein at least one compensation ring is arranged at an axial end surface of the yoke part.

13. The method for manufacturing a stator of a brushless motor according to claim 10, wherein in step 2), the axial end of the inner ring is further fixed with a ground terminal.

14. A stator of a brushless motor, comprising a stator core, an insulation frame arranged on the stator core, and a plurality of windings wound around the insulating frame,
wherein, the stator core comprises a ring-shaped yoke part, and a pole part mounted to a radial inner side of the yoke part;
the pole part comprises a plurality of teeth spaced-apart from each other along a circumferential direction, and a ring-shaped portion connected to radial inner sides of the teeth;
radial outer sides of the teeth abut against the radial inner side of the yoke part;
the insulating frame is arranged on the pole part;
a plurality of power terminals are fixed to one axial end of the insulating frame and respectively electrically connected to the windings;
the insulating frame comprises an inner ring corresponding to the ring-shaped portion and a plurality of branches respectively corresponding to the teeth, the windings are wound on the branches; and
the insulating frame further comprises at least two protrusions formed at a radial inner side of the inner ring, and the at least two protrusions protrude radially and inwardly from the radial inner side of the inner ring.

* * * * *